United States Patent [19]

Seaton

[11] Patent Number: 4,730,323

[45] Date of Patent: Mar. 8, 1988

[54] LASER FREQUENCY DRIFT CONTROL DEVICE AND METHOD

[76] Inventor: Norman T. Seaton, 2821 9th St., Berkeley, Calif. 94710

[21] Appl. No.: 827,234

[22] Filed: Feb. 7, 1986

[51] Int. Cl.⁴ .................................................. H01S 3/13
[52] U.S. Cl. ........................................ 372/32; 372/33; 372/34; 372/38
[58] Field of Search .................... 372/32, 33, 34, 38, 372/61, 87, 99, 29, 76, 20; 350/600

[56] References Cited

U.S. PATENT DOCUMENTS

| | | | |
|---|---|---|---|
| 3,523,256 | 8/1970 | Johnson | 372/78 |
| 3,588,254 | 6/1971 | Rhoades | 372/32 |
| 3,662,279 | 5/1972 | Sandstrom et al. | 372/32 |
| 4,184,127 | 1/1980 | Green et al. | 372/34 |
| 4,573,159 | 2/1986 | Aagano et al. | 372/34 |

*Primary Examiner*—James W. Davie
*Assistant Examiner*—B. Randolph
*Attorney, Agent, or Firm*—Glen R. Grunewald; Thomas R. Lampe

[57] ABSTRACT

A laser frequency drift control device for an electrically powered, integral electrode and end-mirror, gas laser tube is disclosed. The control device includes a resistance and transistor heater assembly, which is electrically connected to be powered by the discharge current of the laser tube and thermally coupled to an end-mirror to heat the same, a thermal sensor coupled to the end-mirror to be heated for the purpose of obtaining temperature feedback, and a control circuit which varies heating of the end-mirror in accordance with the temperature feedback. LEDs provide visual feedback as to operation of the heater assembly to permit adjustment thereof. A method of controlling temperature variation induced laser frequency drift is also disclosed.

14 Claims, 4 Drawing Figures

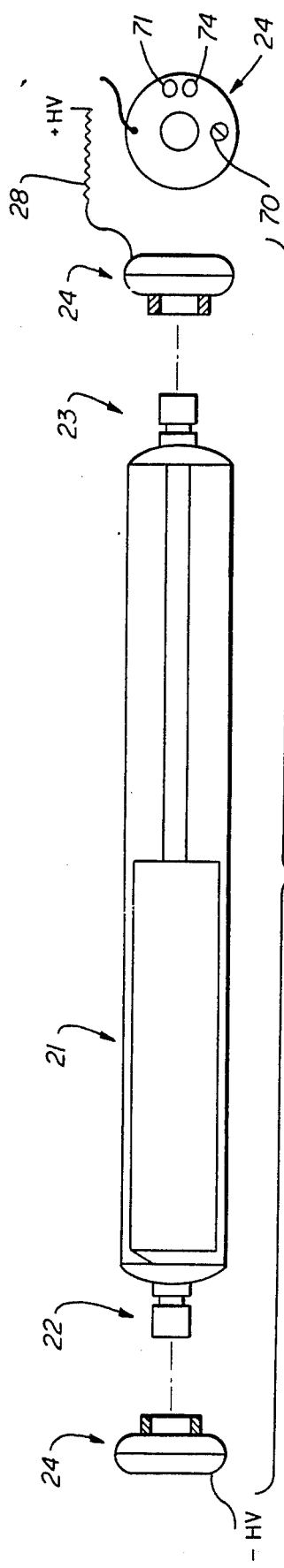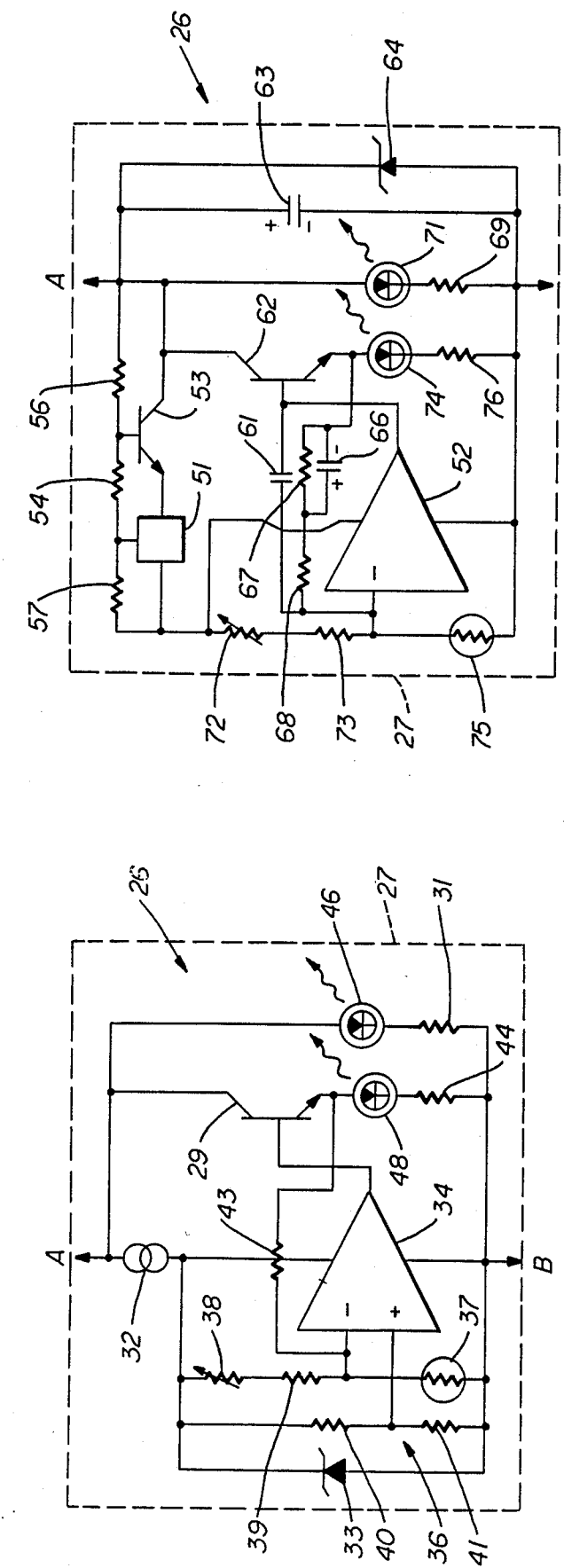

LASER FREQUENCY DRIFT CONTROL DEVICE AND METHOD

TECHNICAL FIELD

The invention relates to lasers and is particularly directed to the reduction of long term frequency drift in precision, frequency-stabilized lasers employing integral end mirror plasma tubes.

BACKGROUND OF THE INVENTION

As described in fuller detail in U.S. Pat. No. 4,468,773, the extraordinary spatial and temporal coherence of some types of gas laser beams has enabled such lasers to find wide application in the field of metrology, and as an element in the control of various high precision laser systems. The ever increasing sophistication required by many current experiments often depends on the attainment of very high orders of frequency stability, both short and long term, in a reference laser. While it has long been known that gas lasers are capable of emitting light waves of truly phenomenal frequency stability, demonstrations of stabilities, such as 1 part in $10^{14}$ [S. N. Bagaev, A. S. Dychkov, and V. P. Chebotaev, Sov. Tech. Phys. Lett. 5(5), May 1979], have been limited to relatively short periods of the order of minutes under ideal laboratory conditions.

Of the many factors that effect the output frequency of a frequency-stabilized gas laser, even of the most sophisticated type, probably the most important is the effect of retroreflection and the way in which that reflection is altered in phase by temperature. [W. R. C. Rowley and D. C. Wilson, Appl. Optics 11, 475 (1975); K. Tanaka and T. Kurosawa, Japan. J. Appl. Phys. 15, 2271 (1976)].

Electronic servo control methods to achieve very high frequency stability in small relatively inexpensive lasers have already been described [U.S. Pat. No. 4,468,773]. The problem of retroreflection from the rear surface of the high reflector in an integral end mirror plasma tube can be eliminated by the incorporation of a small prism in the reflector's original construction, or by a prism which is cemented on after the laser tube has been manufactured. It is customary to apply a high quality anti-reflection coating to the low reflector output mirror to increase the power output and eliminate interference effects, and such a coating also effectively narrows down the beam profile by reducing the "out-of-focus" reflection from the curved surfaces of the output mirror. At first glance such an out-of-focus reflection from the coated exterior surface of the output mirror would not seem to have any resonant coupling to the laser cavity and, therefore, to have no effect on the frequency stability of the laser. Indeed, the effect on frequency stability of retroreflection from the external surface of laser output mirrors seems not to have been discussed at all in either the scientific or the patent literature.

At the levels of frequency stability now in some demand, however, one can expect that there will be some coupling to the plasma nearest the output mirror from at least the primary retroreflection originating at the external surface of the output mirror. A variation in the temperature of the output mirror, which affects the thickness of the mirror and therefore the phase of the retroreflection, also affects the frequency stability of the laser. This effect, in fact, has been experimentally verified b the inventor.

SUMMARY OF THE INVENTION

A broad class of gas lasers utilize an integral end-mirror or end-reflector construction wherein the cavity reflectors are integral with the electrodes energizing the discharge. In order to stabilize the output mirror temperature, and thereby the frequency stability of the laser, it is necessary, where the output mirror is attached to the anode terminal, to minimize the electrically destabilizing effects of excessive capacity to ground, and to provide a very sensitive temperature regulation system that will also withstand the high voltages required to initiate the discharge.

An object of the present invention is to provide a very compact mirror temperature regulator system that can be used for precisely regulating the temperature of either an anode or cathode mirror. The invention achieves this object by sensing changes in the mirror temperature, and using these changes to control or regulate the amount of heat developed in a heat source powered by the plasma tube discharge current.

Another object of the invention is to provide a visual monitoring system to indicate that the temperature regulating system is operating correctly and is without temperature oscillation. This is particularly important in the case of anode mirror temperature regulation where the regulator cannot be electronically probed for correct operation.

BRIEF DESCRIPTION OF DRAWINGS

FIG. 1 is a schematic representation of an integral end-mirror, gas laser tube having a frequency drift control device constructed in accordance with the present invention shown as it may be mounted to either the cathode or anode electrodes.

FIG. 1A is an end elevation view of the control device shown in FIG. 1.

FIG. 2 is a basic schematic diagram of control circuit illustrating the principle for temperature control of the laser end-mirror of FIG. 1.

FIG. 3 is a schematic of an alternative and more stable embodiment of a control circuit suitable for end-mirror temperature control.

DETAILED DESCRIPTION OF PREFERRED EMBODIMENTS

FIG. 1 illustrates an electrically powered gas tube laser, generally designated 21, having integrally mounted end-reflectors and discharge electrodes 22 and 23. As here illustrated electrode/end-mirror 22 is the cathode electrode while terminal/end-mirror 23 is an anode electrode.

Mounted to a selected one of electrodes 22 and 23 is an electrically powered temperature regulator device, generally designated 24. Regulator 24 includes heater means, preferably in the form of a resistor-transistor heater assembly, as is more fully set forth below, and a temperature sensor formed for coupling to an electrode/end-mirror for sensing the temperature of the end-mirror.

In the apparatus of the present invention, the heater means includes a control circuit 26, (FIG. 2) coupled to the temperature sensor for feedback therefrom, and the heater is electrically connected to laser 21 for powered operation by the laser discharge current. Circuit 26 is formed to regulate the heat generated by heater mean based upon temperatures sensed at the end-mirror.

As seen in the simplified schematic of control circuit 26 in FIG. 2, the basic temperature regulating device 24 is a two terminal network in which terminals A and B are mounted in a shielded enclosure 27. When regulator 24 is to be used as an anode mirror regulator, shield 27 is electrically connected to terminal B and to anode 23 and terminal A is electrically connected to the positive high voltage isolating resistor 28 (FIG. 1A). On the other hand, when regulator 24 is to be used to regulate a mirror mounted on cathode 22, shield 27 is connected to terminal A, and terminal B is connected to the cathode current source.

In the regulator of FIG. 2, the transistor 29 and resistor 31 form the basic heater assembly for the regulator. A constant current device ("CCD") 32 supplies a fixed small amount of current to the Zener diode 33. The small voltage across diode 33 is used to power the micropower op-amp ("OA") 34 and a thermistor bridge network, generally designated 36, which and consists of thermistor 37 and resistors 38, 39, 40, and 41. Resistors 43 and 44 provide a feedback voltage dependent on the amount shunting current passed by transistor 29. When the mirror and heat source are cold, the full discharge current (less that supplied to CCD 32) will flow through heating resistor 31 and through a light emitting diode ("LED") 46. As the mirror warms up, thermistor 37, thermally coupled to the mirror being heated will turn on transistor 29 through op-amp 34 to reduce the voltage between terminals A and B. The total amount of power enerated by the constant discharge current fed into regulator 24 will thereby be reduced. Under optimum conditions of adjustment of a temperature controlling resistor 38, approximately equal amounts of current will flow in LED 46 and LED 48, which indicates that regulator 24 is in the middle of its operating range.

Because of the inevitable thermal delay time between the primary heat source of the regulator (transistor 29 and resistor 31) and thermistor temperature sensor 37, the simple circuit of FIG. 2 would be prone to oscillation, especially if the servo-loop gain is adjusted to provide a high order of temperature regulation. Further, the maximum source voltage to which a standard CCD can be subjected, combined with the limited laser tube plasma current, may result in too limited a power dissipation range to accommodate the range of ambient temperatures to which regulator 24 would normally be subjected. The temperature regulator circuit of FIG. 3, therefore, is designed to circumvent these problems.

In the circuit of FIG. 3 the effective working input voltage range of the constant current device (LM 334) 51 supplying 1 ma to power op-amp 52 and the thermistor network, is extended by means of the high voltage transistor 53 and a base divider provided by resistors 54 and 56. Connection of resistor 54 to the current control resistor 57 provides a constant system current, even though the current through divider 54, 56 per se increases with voltage. To minimize circuit volume an LM 3911H is employed as operational amplifier 52, since it contains not only a Zener diode, but effectively also a reference source equivalent to the divider resistors 40 and 41 in FIG. 2. The small capacitor 61 serves to eliminate parasitic oscillations. The high voltage current bypass transistor 62 is chosen for high beta. Tantalum capacitor 63 ($\frac{1}{2}$ $\mu$F) serves to limit starting transient current surges, and Zener diode 64 provides additional similar protection. The tantalum capacitor 66, bypassing the resistor 67, should establish a very long time constant, of the order of 500 seconds, if a high degree of temperature regulation is to be achieved without temperature oscillation. The values for this network along with the value of the damping resistor 68 are best determined experimentally by a bench test in still air for the particular laser tube being stabilized.

As was the case with the circuit of FIG. 2, heating resistor 69 and current bypass transistor 62 are thermally coupled to the end-mirror to be regulated, and resistor 69 is electrically connected in series to a first LED 71. The circuit of FIG. 3 also is provided with adjustable resistor 72, which can be mechanically adjusted by screw 70 (FIG. 1A), a resistor 73 and thermistor 75, which is thermally coupled to sense mirror temperature. A second LED 74 serves to indicate the current flowing in bypass transistor 62. Resistor 76 serves to generate a feedback voltage proportional to the current in pass transistor 62.

To minimize volume and therefore capacity to ground of the system, all components should be miniaturized and wherever possible packed, in cordwood style. All resistors should be of $\frac{1}{8}$ W size except for the power or heating resistor 69, which should be $\frac{1}{4}$ W. Power resistor 69 should be epoxied inside a thin wall brass tube that is soldered, along with the heat sink from transistor 62 to a "heat source tube," which conducts heat to the laser mirror stem or electrode. In order to minimize thermal delays and the tendency for temperature oscillation, it is important to minimize the heat capacity of the sources of heat and to keep all heat conduction paths short. The glass bead thermistor sensor 75 should be coupled thermally as near as possible to the mirror to be controlled but should not "see" the heating resistor-transistor assembly directly. It is also desirable to have the LEDs 71 and 74 as close together as possible in order to make easy a visual comparison of their intensities.

The method of regulating temperature induced frequency drift in an electrically powered, integral end-mirror, gas laser tube of the present invention is comprised of the steps of electrically connecting a voltage-regulated heater means, such as resistor-transistor assembly 69/62, to laser tube electrode for powered operation by the discharge current of the laser. Additionally, resistor-transistor assembly 69/62 is thermally coupled to a selected one of end-mirrors 22 or 23. The method of the present invention further includes the steps of sensing the end-mirror temperature, for example, by thermistor 75, and controlling heating by the heater assembly based upon the temperature sensed. Additionally, the present method includes the steps of visually comparing the light intensity of LEDs 71 and 74 in the heater control circuit 26 and adjusting circuit operation by adjustable resistor 72.

What is claimed is:

1. A laser frequency drift control device for an electrically powered, gas laser tube, said laser tube having an integral electrode and end reflector with a reflector portion, and said laser tube being operable by a discharge current, said drift control device comprising:

electrically powered heater means including electrical connection means for electrically coupling of said heater means to said integral electrode and end reflector for powering of said heater means solely by said discharge current passing therethrough, said heater means sensing the temperature of said integral electrode and end reflector and controlling the generation of heat based upon the temperature sensed, and said heater means having thermal connection means for thermal coupling said heater means to said reflector portion of said integral electrode and end reflector for heating thereof.

2. A laser frequency drift control device as defined in claim 1 wherein,
said heater means is formed for electrical connection to, and for thermal coupling to sense the temperature of and to heat, an integral anode electrode and end reflector.

3. A laser frequency drift control device as defined in claim 1 wherein,
said heater means is formed for electrical connection to, and for thermal coupling to sense the temperature of and to heat, an integral cathode electrode and end reflector.

4. A laser frequency drift control device as defined in claim 1 wherein,
said heater includes means for determining when said heater means is operating at about optimal operating conditions.

5. A laser frequency drift control device as defined in claim 4 wherein,
said means for determining when said heater means is operating at about optimal operating conditions is provided by a pair of light emitting diodes positioned in side-by-side relation for simultaneous viewing and electrically coupled to said heater means for emission of substantially the same light intensity upon operation of said heater means at about optimal operating conditions.

6. A laser frequency drift conrol device as defined in claim 1 wherein,
said heater means includes:
(i) a heating resistor and a current bypass transistor assembly,
(ii) a first light emitting diode electrically coupled in series with said heating resistor,
(iii) a temperature sensor network electrically connected to control the assembly of said heating resistor and said bypass transistor,
(iv) temperature sensor means mounted for thermal coupling to said end reflector and electrically connected to said temperature sensor network, and
(v) a second light emitting diode electrically connected in series with said bypass transistor, said first and second light emitting diodes being positioned for simultaneous visual comparison of the light emitted therefrom.

7. A laser frequency drift control device as defined in claim 6 wherein,
said heater means further includes adjustable resistor means electrically connected to said sensor network to enable variation of the temperature setting produced in response to temperature sensed by said sensor means.

8. An electrically powered, integral end-mirror, gas laser tube and regulator device comprising:
(a) an electrically powered, gas laser tube having an integral anode electrode and end-mirror, an integral cathode electrode and end-mirror, said laser tube being powered by a discharge current; and
(b) a temperature regulator thermally coupled to one of the integral electrodes and end-mirrors for regulation of the temperature thereof and electrically connected in series between a voltage source and one of the integral electrodes and end-mirrors, said temperature regulator being formed to generate heat solely from the laser discharge current, and said regulator being coupled and formed for feedback of temperature sensing input from said one of said integral electrodes and end-mirrors to vary the heat generated by said regulator.

9. The gas laser and regulator device as defined in claim 8 wherein,
said one of said integral electrodes and end-mirrors is a cathode electrode and end-mirror.

10. The gas laser and regulator device as defined in claim 8 wherein,
said one of said integral electrodes and end-mirrors is an anode electrode and end-mirror.

11. A method of regulating temperature induced frequency drift in an electrically powered, integral electrode and end-mirror, gas laser tube comprising the steps of:
(a) electrically connecting a temperature regulating heater means to said laser tube for powered operation of said heater means by the discharge current of said laser tube;
(b) thermally coupling said heater means to an end-mirror of said laser tube for heating of said end-mirror;
(c) sensing the temperature of said end-mirror; and
(d) controlling the operation of said heater means based upon temperature sensed during said sensing step.

12. The method of regulating as defined in claim 11 wherein,
said electrically connecting step is accomplished by connecting said heater means to the anode electrode of said laser tube.

13. The method of regulating as defined in claim 11 wherein,
said electrically connecting step is accomplished by connecting said heater means to the cathode electrode of said laser tube.

14. The method of regulating as defined in claim 11 wherein said heater means includes a pair of LEDs electrically connected to provide a visual indication of the operation of said heater means, and means for adjusting the operation of said heater means and the step of:
adjusting the operation of said heater means by said means for adjusting based upon visually perceived information from said LEDs.

* * * * *